United States Patent
Yadav

(10) Patent No.: US 7,708,974 B2
(45) Date of Patent: May 4, 2010

(54) TUNGSTEN COMPRISING NANOMATERIALS AND RELATED NANOTECHNOLOGY

(75) Inventor: Tapesh Yadav, Longmont, CO (US)

(73) Assignee: PPG Industries Ohio, Inc., Cleveland, OH (US)

(*) Notice: Subject to any disclaimer, the term of this patent is extended or adjusted under 35 U.S.C. 154(b) by 1394 days.

(21) Appl. No.: 11/125,316

(22) Filed: May 10, 2005

(65) Prior Publication Data

US 2005/0271566 A1 Dec. 8, 2005

Related U.S. Application Data

(63) Continuation-in-part of application No. 10/679,611, filed on Oct. 6, 2003, and a continuation-in-part of application No. 10/315,272, filed on Dec. 10, 2002, now Pat. No. 7,547,431.

(60) Provisional application No. 60/569,689, filed on May 10, 2004.

(51) Int. Cl.
| | |
|---|---|
| C22B 3/00 | (2006.01) |
| C01B 13/14 | (2006.01) |
| C01C 1/00 | (2006.01) |
| C01G 25/02 | (2006.01) |
| C04B 35/00 | (2006.01) |
| B32B 5/16 | (2006.01) |
| B32B 9/00 | (2006.01) |
| H01L 39/24 | (2006.01) |

(52) U.S. Cl. .......... 423/594.13; 423/1; 423/592.1; 423/604; 423/606; 423/622; 501/134; 428/402; 505/473; 429/30; 429/44; 977/811; 977/812; 250/462.1; 347/106

(58) Field of Classification Search .......... 423/1, 423/604, 592.1, 594.18, 608, 618, 622, 594.13, 423/606; 428/204, 402, 195.1, 206; 429/30, 429/44; 502/339; 252/514; 250/462.1; 247/106; 347/106; 977/811–812

See application file for complete search history.

(56) References Cited

U.S. PATENT DOCUMENTS

| | | | |
|---|---|---|---|
| 2,952,575 A | * | 9/1960 | Baltzer .......... 359/359 |
| 3,531,413 A | | 9/1970 | Rosensweig |
| 3,565,676 A | | 2/1971 | Holzl |
| 3,635,819 A | | 1/1972 | Kaiser |
| 3,700,575 A | | 10/1972 | Paine |
| 3,734,790 A | | 5/1973 | Kirshenbaum |
| 3,764,540 A | | 10/1973 | Khalafalla et al. |

(Continued)

FOREIGN PATENT DOCUMENTS

| | | |
|---|---|---|
| DE | 4238688 | 5/1994 |

(Continued)

OTHER PUBLICATIONS

U.S. Appl. No. 60/310,967, filed Aug. 8, 2001, Yadav.

(Continued)

*Primary Examiner*—Anthony J Green
*Assistant Examiner*—Pegah Parvini
(74) *Attorney, Agent, or Firm*—Donald R. Palladino

(57) ABSTRACT

Nanoparticles comprising tungsten, methods of manufacturing nanoparticles comprising tungsten, and applications of nanoparticles comprising tungsten, such as electronics, optical devices, photonics, reagents for fine chemical synthesis, pigments, and catalysts are provided.

11 Claims, 1 Drawing Sheet

U.S. PATENT DOCUMENTS

| | | |
|---|---|---|
| 3,806,449 A | 4/1974 | Kaiser |
| 3,905,109 A | 9/1975 | Cohen et al. |
| 3,917,538 A | 11/1975 | Rosensweig |
| 3,981,844 A | 9/1976 | Romankiw |
| 4,017,820 A | 4/1977 | Ross |
| 4,019,994 A | 4/1977 | Kelley |
| 4,094,804 A | 6/1978 | Shimoiizaka |
| 4,208,294 A | 6/1980 | Khalafalla et al. |
| 4,234,437 A | 11/1980 | Friberg et al. |
| 4,252,678 A | 2/1981 | Smith |
| 4,280,918 A | 7/1981 | Homola et al. |
| 4,292,029 A | 9/1981 | Craig et al. |
| 4,315,827 A | 2/1982 | Bottenberg et al. |
| 4,329,241 A | 5/1982 | Massart |
| 4,356,098 A | 10/1982 | Chagnon |
| 4,381,244 A | 4/1983 | Berkowitz et al. |
| 4,381,922 A | 5/1983 | Frey et al. |
| 4,416,721 A | 11/1983 | Deregibus |
| 4,426,356 A | 1/1984 | Nair |
| 4,430,239 A | 2/1984 | Wyman |
| 4,453,199 A | 6/1984 | Ritchie et al. |
| 4,484,943 A | 11/1984 | Miura et al. |
| 4,485,085 A | 11/1984 | David et al. |
| 4,534,917 A | 8/1985 | Walz |
| 4,584,244 A | 4/1986 | Fenton |
| 4,588,575 A | 5/1986 | David |
| 4,609,608 A | 9/1986 | Solc |
| 4,610,857 A | 9/1986 | Ogawa et al. |
| 4,619,845 A | 10/1986 | Ayers et al. |
| 4,631,952 A | 12/1986 | Donaghey |
| 4,642,207 A | 2/1987 | Uda et al. |
| 4,701,218 A | 10/1987 | Barker et al. |
| 4,721,610 A | 1/1988 | Yoshida et al. |
| 4,760,296 A | 7/1988 | Johnson et al. |
| 4,842,832 A | 6/1989 | Inoue et al. |
| 4,851,262 A | 7/1989 | McFeaters |
| 4,857,492 A | 8/1989 | Bradley et al. |
| 4,944,985 A | 7/1990 | Alexander et al. |
| 4,984,446 A | 1/1991 | Yagawara et al. |
| 4,988,539 A | 1/1991 | Breuil et al. |
| 5,011,627 A | 4/1991 | Lutz et al. |
| 5,030,669 A | 7/1991 | Hendrickson et al. |
| 5,093,286 A | 3/1992 | Nogami et al. |
| 5,106,796 A * | 4/1992 | Drozdyk et al. ............. 501/137 |
| 5,127,951 A | 7/1992 | Imasato et al. |
| 5,128,081 A | 7/1992 | Siegel et al. |
| 5,130,210 A | 7/1992 | Iwasaki et al. |
| 5,130,277 A | 7/1992 | Ueda et al. |
| 5,134,039 A | 7/1992 | Alexander et al. |
| 5,147,448 A | 9/1992 | Roberts et al. |
| 5,149,381 A | 9/1992 | Grewe et al. |
| 5,149,596 A | 9/1992 | Smith et al. |
| 5,165,992 A * | 11/1992 | Yajima ....................... 428/328 |
| 5,180,394 A | 1/1993 | Davidson |
| 5,180,650 A | 1/1993 | Sacripante et al. |
| 5,187,209 A | 2/1993 | Hirai et al. |
| 5,190,583 A | 3/1993 | Menzel et al. |
| 5,194,128 A | 3/1993 | Beaty et al. |
| 5,215,580 A | 6/1993 | Elfenthal et al. |
| 5,252,949 A | 10/1993 | Kirby et al. |
| 5,258,338 A | 11/1993 | Maher |
| 5,264,157 A | 11/1993 | Bidan et al. |
| 5,308,804 A | 5/1994 | Lee |
| 5,334,292 A | 8/1994 | Rajeshwar et al. |
| 5,338,430 A | 8/1994 | Parsonage et al. |
| 5,350,641 A | 9/1994 | Mogensen et al. |
| 5,355,764 A | 10/1994 | Marinos et al. |
| 5,356,120 A | 10/1994 | König et al. |
| 5,356,842 A | 10/1994 | Yamakawa et al. |
| 5,368,951 A | 11/1994 | Shiratori et al. |
| 5,381,664 A | 1/1995 | Bennett et al. |
| 5,385,776 A | 1/1995 | Maxfield et al. |
| 5,387,462 A | 2/1995 | Debe |
| 5,403,375 A | 4/1995 | König et al. |
| 5,407,458 A | 4/1995 | König et al. |
| 5,414,588 A | 5/1995 | Barbee, Jr. et al. |
| 5,417,956 A | 5/1995 | Moser |
| 5,420,083 A | 5/1995 | Brandt |
| 5,420,227 A * | 5/1995 | Pfeil et al. .................. 528/303 |
| 5,427,672 A | 6/1995 | Böcker et al. |
| 5,433,906 A | 7/1995 | Dasch et al. |
| 5,447,708 A | 9/1995 | Helble et al. |
| 5,460,830 A | 10/1995 | Kossovsky et al. |
| 5,462,751 A | 10/1995 | Kossovsky et al. |
| 5,462,903 A | 10/1995 | Rousset et al. |
| 5,466,575 A | 11/1995 | Cozzette et al. |
| 5,466,587 A | 11/1995 | Fitzpatrick-McElligott et al. |
| 5,466,652 A | 11/1995 | Paparizos et al. |
| 5,468,358 A | 11/1995 | Ohkawa et al. |
| 5,472,477 A | 12/1995 | König |
| 5,476,003 A | 12/1995 | Neumann |
| 5,482,656 A | 1/1996 | Hiraoka et al. |
| 5,486,277 A | 1/1996 | Barbee, Jr. et al. |
| 5,486,435 A | 1/1996 | Brochu et al. |
| 5,486,675 A | 1/1996 | Taylor et al. |
| 5,489,449 A | 2/1996 | Umeya et al. |
| 5,503,081 A | 4/1996 | Lindblom et al. |
| 5,507,965 A | 4/1996 | Padoy et al. |
| 5,514,734 A | 5/1996 | Maxfield et al. |
| 5,518,810 A | 5/1996 | Nishihara et al. |
| 5,527,849 A | 6/1996 | Roman et al. |
| 5,539,965 A | 7/1996 | Safari et al. |
| 5,548,000 A | 8/1996 | Nagel et al. |
| 5,548,474 A | 8/1996 | Chen et al. |
| 5,549,700 A | 8/1996 | Graham et al. |
| 5,554,670 A | 9/1996 | Giannelis et al. |
| 5,560,960 A | 10/1996 | Singh et al. |
| 5,569,561 A | 10/1996 | Exnar et al. |
| 5,571,401 A | 11/1996 | Lewis et al. |
| 5,571,612 A | 11/1996 | Motohiro et al. |
| 5,590,387 A | 12/1996 | Schmidt et al. |
| 5,593,939 A | 1/1997 | Saito et al. |
| 5,614,011 A | 3/1997 | Binder et al. |
| 5,618,475 A | 4/1997 | Johnson et al. |
| 5,624,718 A | 4/1997 | Dearney |
| 5,629,075 A | 5/1997 | Ishikawa et al. |
| 5,629,474 A | 5/1997 | Williams |
| 5,635,654 A | 6/1997 | Hebsur et al. |
| 5,650,156 A | 7/1997 | Grinstaff et al. |
| 5,665,277 A | 9/1997 | Johnson et al. |
| 5,665,807 A | 9/1997 | Roman et al. |
| 5,679,471 A | 10/1997 | Cheng et al. |
| 5,681,575 A | 10/1997 | Burrell et al. |
| 5,688,417 A | 11/1997 | Cadre et al. |
| 5,690,706 A | 11/1997 | Sigalas et al. |
| 5,709,786 A | 1/1998 | Friese et al. |
| 5,714,536 A | 2/1998 | Ziolo et al. |
| 5,718,047 A | 2/1998 | Nakayama et al. |
| 5,720,805 A | 2/1998 | Wellinghoff et al. |
| 5,726,247 A | 3/1998 | Michalczyk et al. |
| 5,739,193 A | 4/1998 | Walpita et al. |
| 5,764,004 A | 6/1998 | Rabinowitz |
| 5,770,022 A | 6/1998 | Chang et al. |
| 5,770,126 A | 6/1998 | Singh et al. |
| 5,788,738 A | 8/1998 | Pirzada |
| 5,800,866 A * | 9/1998 | Myers et al. ................ 427/220 |
| 5,840,387 A | 11/1998 | Berlowitz-Tarrant et al. |
| 5,851,507 A | 12/1998 | Pirzada |
| 5,858,080 A | 1/1999 | Bugnon |
| 5,874,134 A | 2/1999 | Rao et al. |
| 5,876,683 A | 3/1999 | Glumac et al. |
| 5,880,197 A | 3/1999 | Beall et al. |
| 5,891,986 A | 4/1999 | Yamaguchi et al. |
| 5,897,945 A | 4/1999 | Lieber et al. |

| | | | | | | |
|---|---|---|---|---|---|---|
| 5,905,000 | A | 5/1999 | Yadav et al. | 6,497,729 B1 | 12/2002 | Moussy et al. |
| 5,922,537 | A | 7/1999 | Ewart et al. | 6,498,208 B2 | 12/2002 | Border et al. |
| 5,935,461 | A | 8/1999 | Witherspoon et al. | 6,503,316 B1 | 1/2003 | Sakoske et al. |
| 5,939,146 | A | 8/1999 | Lavernia | 6,503,475 B1 | 1/2003 | McCormick et al. |
| 5,952,040 | A | 9/1999 | Yadav et al. | 6,528,029 B1 | 3/2003 | Dettling et al. |
| 5,981,415 | A | 11/1999 | Waku et al. | 6,541,112 B1 | 4/2003 | Swiler |
| 5,984,997 | A | 11/1999 | Bickmore | 6,548,171 B1 | 4/2003 | Barbera-Guillem et al. |
| 5,989,648 | A | 11/1999 | Phillips | 6,569,397 B1 | 5/2003 | Yadav |
| 6,020,419 | A | 2/2000 | Bock et al. | 6,572,672 B2 | 6/2003 | Yadav et al. |
| 6,027,742 | A | 2/2000 | Lee et al. | 6,572,693 B1 | 6/2003 | Wu et al. |
| 6,036,774 | A | 3/2000 | Lieber et al. | 6,589,312 B1 | 7/2003 | Snow et al. |
| 6,042,900 | A | 3/2000 | Rakhimov et al. | 6,600,127 B1 | 7/2003 | Peterson et al. |
| 6,045,925 | A | 4/2000 | Klabunde et al. | 6,602,595 B2 | 8/2003 | Yadav et al. |
| 6,057,637 | A | 5/2000 | Zettl et al. | 6,616,968 B2 | 9/2003 | Bostrom et al. |
| 6,065,476 | A | 5/2000 | Agrawal et al. | 6,623,557 B2 | 9/2003 | Hayashi et al. |
| 6,080,232 | A | 6/2000 | Sperlich et al. | 6,652,967 B2 | 11/2003 | Yadav |
| 6,109,095 | A | 8/2000 | Addiego | 6,653,356 B2 | 11/2003 | Sherman |
| 6,110,266 | A | 8/2000 | Gonzales-Blanco et al. | 6,663,948 B1 | 12/2003 | Takiyama et al. |
| 6,110,399 | A | 8/2000 | McArdle et al. | 6,667,360 B1 | 12/2003 | Ng et al. |
| 6,110,557 | A | 8/2000 | Weir et al. | 6,680,279 B2 | 1/2004 | Cai et al. |
| 6,114,038 | A | 9/2000 | Castro et al. | 6,682,872 B2 | 1/2004 | Sachdev et al. |
| 6,117,541 | A | 9/2000 | Frisk | 6,689,192 B1 | 2/2004 | Phillips et al. |
| 6,127,450 | A | 10/2000 | Angeletakis | 6,689,823 B1 | 2/2004 | Bellare et al. |
| 6,132,563 | A | 10/2000 | Frach et al. | 6,693,143 B2 | 2/2004 | Pflug |
| 6,132,905 | A | 10/2000 | Kumar et al. | 6,716,525 B1 | 4/2004 | Yadav et al. |
| 6,139,618 | A | 10/2000 | Hayashi et al. | 6,719,821 B2 | 4/2004 | Yadav |
| 6,143,356 | A | 11/2000 | Jablonski | 6,726,992 B1 | 4/2004 | Yadav et al. |
| 6,162,532 | A | 12/2000 | Black et al. | 6,746,791 B2 | 6/2004 | Yadav et al. |
| 6,165,247 | A | 12/2000 | Kodas et al. | 6,800,127 B2 | 10/2004 | Babler |
| 6,170,292 | B1 | 1/2001 | Boulos et al. | 6,830,710 B2 | 12/2004 | Bennett et al. |
| 6,180,389 | B1 | 1/2001 | Douglas et al. | 6,830,822 B2 | 12/2004 | Yadav |
| 6,194,481 | B1 | 2/2001 | Furman et al. | 6,832,735 B2 | 12/2004 | Yadav |
| 6,214,368 | B1 | 4/2001 | Lee et al. | 6,849,109 B2 | 2/2005 | Yadav et al. |
| 6,228,904 | B1 | 5/2001 | Yadav | 6,855,426 B2 | 2/2005 | Yadav |
| 6,258,417 | B1 | 7/2001 | Goswami et al. | 6,855,749 B1 | 2/2005 | Yadav et al. |
| 6,258,974 | B1 | 7/2001 | Wellinghoff et al. | 6,916,872 B2 | 7/2005 | Yadav et al. |
| 6,261,484 | B1 | 7/2001 | Phillips et al. | 6,933,331 B2 | 8/2005 | Yadav et al. |
| 6,268,054 | B1 | 7/2001 | Costantino et al. | 2001/0038803 A1 | 11/2001 | Morales et al. |
| 6,268,222 | B1 | 7/2001 | Chandler et al. | 2002/0018854 A1 * | 2/2002 | McCarthy et al. ............ 427/387 |
| 6,270,347 | B1 | 8/2001 | Webster et al. | 2002/0033131 A1 | 3/2002 | Bostrom et al. |
| 6,291,070 | B1 | 9/2001 | Arpac et al. | 2002/0100164 A1 | 8/2002 | Tanaka et al. |
| 6,294,009 | B1 | 9/2001 | Letschert et al. | 2002/0149656 A1 | 10/2002 | Nohr et al. |
| 6,299,937 | B1 | 10/2001 | Richart | 2003/0017336 A1 | 1/2003 | Gedanken et al. |
| 6,300,640 | B1 | 10/2001 | Bhargava et al. | 2003/0035955 A1 | 2/2003 | Yadav |
| 6,306,610 | B1 | 10/2001 | Bawendi et al. | 2003/0102099 A1 | 6/2003 | Yadav et al. |
| 6,312,831 | B1 | 11/2001 | Crawley et al. | 2003/0122114 A1 | 7/2003 | Dobler et al. |
| 6,326,144 | B1 | 12/2001 | Bawendi et al. | 2003/0124043 A1 | 7/2003 | Yadav |
| 6,328,798 | B1 | 12/2001 | Bostrom et al. | 2003/0124050 A1 | 7/2003 | Yadav et al. |
| 6,331,312 | B1 | 12/2001 | Lee et al. | 2003/0132420 A1 | 7/2003 | Yadav |
| 6,344,271 | B1 | 2/2002 | Yadav | 2003/0199624 A1 | 10/2003 | Yadav et al. |
| 6,361,161 | B1 | 3/2002 | Anstadt et al. | 2003/0207112 A1 | 11/2003 | Yadav |
| 6,375,864 | B1 | 4/2002 | Phillips et al. | 2003/0207977 A1 | 11/2003 | Yadav et al. |
| 6,387,519 | B1 | 5/2002 | Anderson et al. | 2003/0207978 A1 | 11/2003 | Yadav et al. |
| 6,387,981 | B1 | 5/2002 | Zhang et al. | 2003/0209057 A1 | 11/2003 | Yadav et al. |
| 6,399,037 | B1 | 6/2002 | Pflug et al. | 2003/0224214 A1 | 12/2003 | Garito et al. |
| 6,410,765 | B1 | 6/2002 | Wellinghoff et al. | 2004/0021133 A1 | 2/2004 | Nagpal et al. |
| 6,413,638 | B1 | 7/2002 | Mager et al. | 2004/0127987 A1 | 7/2004 | Evans et al. |
| 6,416,818 | B1 | 7/2002 | Aikens et al. | 2004/0139820 A1 | 7/2004 | Kodas et al. |
| 6,416,868 | B1 | 7/2002 | Sullivan et al. | 2004/0139888 A1 | 7/2004 | Yadav |
| 6,417,127 | B1 | 7/2002 | Yamamoto et al. | 2004/0178530 A1 | 9/2004 | Yadav et al. |
| 6,419,989 | B1 | 7/2002 | Betz et al. | 2004/0180203 A1 | 9/2004 | Yadav et al. |
| 6,432,526 | B1 | 8/2002 | Arney et al. | 2004/0233526 A1 | 11/2004 | Kaminsky et al. |
| 6,432,866 | B1 | 8/2002 | Tennent et al. | | | |
| 6,436,317 | B1 * | 8/2002 | Malozemoff et al. ...... 252/519.1 | | FOREIGN PATENT DOCUMENTS | |
| 6,440,243 | B1 | 8/2002 | Tan et al. | | | |
| 6,440,561 | B2 | 8/2002 | Hayashi et al. | EP | 0 004 859 B1 | 10/1979 |
| 6,447,806 | B1 | 9/2002 | Gassmann et al. | EP | 0 084 769 A2 | 8/1983 |
| 6,447,848 | B1 | 9/2002 | Chow et al. | EP | 0 550 874 A1 | 7/1993 |
| 6,467,897 | B1 | 10/2002 | Wu et al. | EP | 0 736 885 B1 | 10/1996 |
| 6,468,497 | B1 | 10/2002 | Khan et al. | EP | 0 810 259 A1 | 12/1997 |
| 6,468,808 | B1 | 10/2002 | Nie et al. | EP | 1215041 A1 * | 12/2001 |
| 6,479,156 | B1 | 11/2002 | Schmidt et al. | FR | 2 722 492 | 1/1996 |
| 6,485,557 | B1 | 11/2002 | Swiler | JP | 60-196659 | 5/1985 |

| | | |
|---|---|---|
| JP | 102110 | 4/1990 |
| JP | 08261979 | 11/1996 |
| JP | 102110 | 6/1998 |
| RU | 1654258 | 6/1991 |
| WO | WO 91/06036 A | 5/1991 |
| WO | WO 94/01143 | 1/1994 |
| WO | WO 95/00609 | 1/1995 |
| WO | WO 95/01643 A | 1/1995 |
| WO | WO 96/29711 | 9/1996 |
| WO | WO 97/15935 | 5/1997 |
| WO | WO 97/16479 | 5/1997 |
| WO | WO 97/24297 | 7/1997 |
| WO | WO 00/66485 * | 9/2000 |

OTHER PUBLICATIONS

U.S. Appl. No. 60/569,689, filed May 10, 2004, Yadav.
U.S. Appl. No. 10/424,395, filed Apr. 28, 2003.
U.S. Appl. No. 10/434,828, filed May 9, 2003.
U.S. Appl. No. 10/435,287, filed May 9, 2003.
U.S. Appl. No. 10/435,222, filed May 20, 2003.
U.S. Appl. No. 10/441,501, filed May 20, 2003.
U.S. Appl. No. 10/679,611, filed Oct. 6, 2003.
U.S. Appl. No. 10/426,414, filed Apr. 30, 2003.
Beck and Siegel, "J. Mater. Res.," 7, 2840 (1992).
Bronstein et al., "Nanodispersed Cobalt Particles in a Thermolysed Poly(acrylonitrile) Matrix," J. Muter: Chem., 5(8):1197-1201, 1995. Month unavailable and not in issue.
Buhro et al., "Semiconductor Nanocrystals Shape Matters," Nature Materials, vol. 2, Mar. 2003.
Burdon et al., "Control of particle size and orientation during in situ precipitation of oxides in polymers" Mat Res. Soc. Symp PRoc (1993) vol. 286 (Nanophase and Nanocomposite Materials) pp. 315-320.
Chen et al., "Homogeneous dispersion of Nanostructured Aluminum Nitride in a Polyimide Matrix," Advanced Materials, 1994(6):481-484, 1994. Month unavailable and not in issue.
Chen et al., "Preparation of nanoscale iron and $Fe_3O_4$ powders in a polymer matrix," J. Mat. Sci., 32:3571-3575, Jul. 1, 1997.
Definition of "pigment": Grant & Hackh's Chemical Dictionary, 1989.
Definition of "pigment": Hawley's Condensed Chemical Dictionary, 1993.
Duan et al., "High-performance thin-film transistors using semiconductor nanowires and nanoribbons," J. Nature, vol. 425, Sep. 18, 2003, pp. 274-178.
Eastman et al., "Processing and Properties of Nanophase Oxides," Mater Res. Soc. Symp. Proc., 155, 255, 1989.
Edlund et al., "Thin-film polymeric sensors for detection and quantification of multivalent metal ions", Sensors and Actuators B. 10; 185-190, 1993.
Gaggiotti et al. "Surface chemistry of tin oxide based gas sensors", Appl. Phys., 76(8);4467-71, Oct. 15, 1994.
Gaggiotti et al., "Temperature dependencies of sensitivity and surface chemical composition of $SnO_2$ gas sensors", Elsevier Sci., S.A., 516-19, (1995).
Gleiter, H., "Mechanical Properties and Deformation Behavior of Materials Having Ultra-Fine Microstructures," Nastasi et al. Ed., 3-35 (1993).
Hahn et al., "Mater. Res. Soc. Symp. Proc.," 196, 71 (1990).
Hussain et al., "Mechanical property improvement of carbon fiber reinforced epoxy composites by $Al_2O_3$ filler dispersion," Materials Letters, 26:185-191, Feb. 1996.

Iwama et al, "Ultrafine Powders of TiN and AlN Produced by a Reactive Gas Evaporation Technique with Electron Beam Heating," Journal of Crystal Growth 56 (1982) 265-269, North-Holland Publishing Company.
Jacobson et al., "Rapid Solidification Processing." Mat. Sci. and Eng., R11.335 (1994).
Jiang et al., "Crystalline Silver Nanowires by Soft Solution Processing," Nano Letters, Published on Web Jan. 3, 2002, vol. 2, No. 2, 165-168.
Jiang et al., "CuO Nanowires Can be Synthesized by Heating Copper Substrates in Air," Nano Letters, Published on Web Oct. 24, 2002, vol. 2, No. 12, Dec. 2002.
Jones, H.,"Splat Cooling and Metastable Phases," Rep. Prog. Phys. 36. 1425 (1973).
Jun et al., "Carbon coated Fe, Co and Ni ferromagentic nanoparticles prepared by modified arc discharge," Proceedings-Electrochemical Society (1996), vol. 3, pp. 688-702.
Kaiser et al. (IV) J. Applied Phys., 1970, pp. 1064-1072, (41).
Kirk-Othmer Encyclopedia of Chemical Technology, p. 37, vol. 19.
Mayo, M.J., Mechanical Properties and Deformation Behavior of Materials Having Ultra-fine Microstructures, 361 (1993).
Mutsuo et al., "Nanometer size oxide coating on fine particles surface by local hydrolysis method," Nagoya Kogyo Gijutsu Kenskyusho Hokoku (1995), 44(10), pp. 493-529.
Nieman et al:, "Scripta Metall. et Mater.," 24, 145 (1990).
Nieman et al., J. Mater. Res., 6, 1012 (1991).
Phani, A.R., "X-ray photoelectron spectroscopy studies on Pd doped $SnO_2$ liquid petroleum gas sensor", Appl. Phys. Lett., 71(16); 2358-60, Oct. 20, 1997.
Serrini "Chemical composition and crystalline structure of $SnO_2$ thin films used as gas sensors", Elsevier Sci. S.A., 113-22, 1997.
Siegel, R. W., Materials Science and Technology. 15. VCH. Weinhem. 583 (1991).
Siegel, R.W., "Mechanical Properties and Deformation Behavior of Materials Having Ultra-fine Microstructures," Nastasi et al. Ed., 509 (1993).
Skandon et al., "Scripta Metall. et Mater.," 25,2389 (1991).
Springer, G.S., "Advances in Heat Transfer," 14,281-341, Academic Press (1978).
Steigerwald and Brus, "Ann. Rev. Mater. Sc.," 19, 471 (1989).
Sugaya et al., IEEE Trans. on Magnetics, 31, 2197 (1995).
Sun et al., "Crystalline Silver Nanowires by Soft Solution Processing," Nano Letters, Published on Web Jan. 3, 2002, 2002, vol. 2, No. 2, pp. 165-168.
Tamaki et al., "J. Electrochem. Soc.," 141, 2207 (1994).
Tomohiro et al., "Influence of oxygen content on the mechanical properties of in-situ forme Si3N4-SiC nanocomposites prepared by carbon coating," Journal of the Ceramic Society of Japan (1995), 103 (Nov.), pp. 1177-1181.
Uyeda, R., "Prog. Mater. Sci.," 35, 1 (1991), and R. W. Siegel, Materials Science and Technology, 15, VCH, Weinhem, 583 (1991).
Uyeda, R., "Studies of Ultrafine Particles in . . . ," Prog. Mater. Sci., 35, 1 (1991).
Wang et al., "Inorganic Materials Nanocrystals branch out," Nature Materials, vol. 2, Jun. 2003.
Wu et al., "Block-by-Block Growth of Single-Crystalline SlISiGe Superlattice Nanowires," Nano Letters, Published on Web Jan. 19, 2002, vol. 2, No. 2, pp. 83-86.
Yeack Scranton, "Nanomagnetism," Kluwer Academic, Netherland, 1-6 (1993).
Zhang et al., "Lithium-Assisted Self-Assembly of Aluminum Carbide Nanowires and Nanoribbons," Nano Letters, Published on Web Dec. 14, 2001; 2002, vol. 2, No. 2, pp. 105-108.

* cited by examiner

US 7,708,974 B2

TUNGSTEN COMPRISING NANOMATERIALS AND RELATED NANOTECHNOLOGY

CROSS-REFERENCE TO RELATED PATENT APPLICATIONS

This application is a continuation-in-part of U.S. patent application Ser. No. 10/679,611, filed Oct. 6, 2003, which is hereby incorporated by reference in its entirety. This application is also a continuation-in-part of U.S. patent application Ser. No. 10/315,272, filed Dec. 10, 2002, now U.S. Pat. No. 7,547,431, which is hereby incorporated by reference in its entirety. The present application claims the benefit of provisional application under 60/569,689, filed May 10, 2004, which application is hereby incorporated by reference in its entirety.

FIELD OF THE INVENTION

The present invention generally relates to methods of manufacturing submicron and nanoscale powders comprising tungsten and applications of such powders.

RELEVANT BACKGROUND

Nanopowders in particular and sub-micron powders in general are a novel family of materials whose distinguishing feature is that their domain size is so small that size confinement effects become a significant determinant of the materials' performance. Such confinement effects can, therefore, lead to a wide range of commercially important properties. Nanopowders, therefore, are an extraordinary opportunity for design, development, and commercialization of a wide range of devices and products for various applications. Furthermore, since they represent a whole new family of material precursors where conventional coarse-grain physiochemical mechanisms are not applicable, these materials offer unique combinations of properties that can enable novel and multifunctional components of unmatched performance. Yadav et al. in U.S. Pat. No. 6,344,271 and in co-pending and commonly assigned U.S. patent application Ser. Nos. 09/638,977, 10/004,387, 10/071,027, 10/113,315, and 10/292,263, all of which along with the references contained therein are hereby incorporated by reference in their entirety, teach some applications of sub-micron and nanoscale powders.

SUMMARY OF THE INVENTION

Briefly stated, the present invention involves methods for manufacturing nanoscale powders comprising tungsten and applications thereof.

In some embodiments, the present invention provides nanoparticles of doped or undoped tungsten oxides.

In some embodiments, the present invention provides methods for manufacturing doped or undoped metal oxides comprising tungsten.

In some embodiments, the present invention provides oxide composites and coatings that comprise doped or undoped tungsten.

In some embodiments, the present invention provides applications of powders comprising doped or undoped tungsten oxides.

In some embodiments, the present invention provides catalysts for use in a variety of applications.

In some embodiments, the present invention provides additives for use in a variety of applications.

In some embodiments, the present invention provides materials and devices for optical, sensing, thermal, biomedical, structural, superconductive, energy, and security application, as well as other applications.

In some embodiments, the present invention provides methods for producing novel nanoscale powders comprising tungsten in high volume, low-cost, and reproducible quality.

DETAILED DESCRIPTION OF THE PREFERRED EMBODIMENTS

Figure 1:
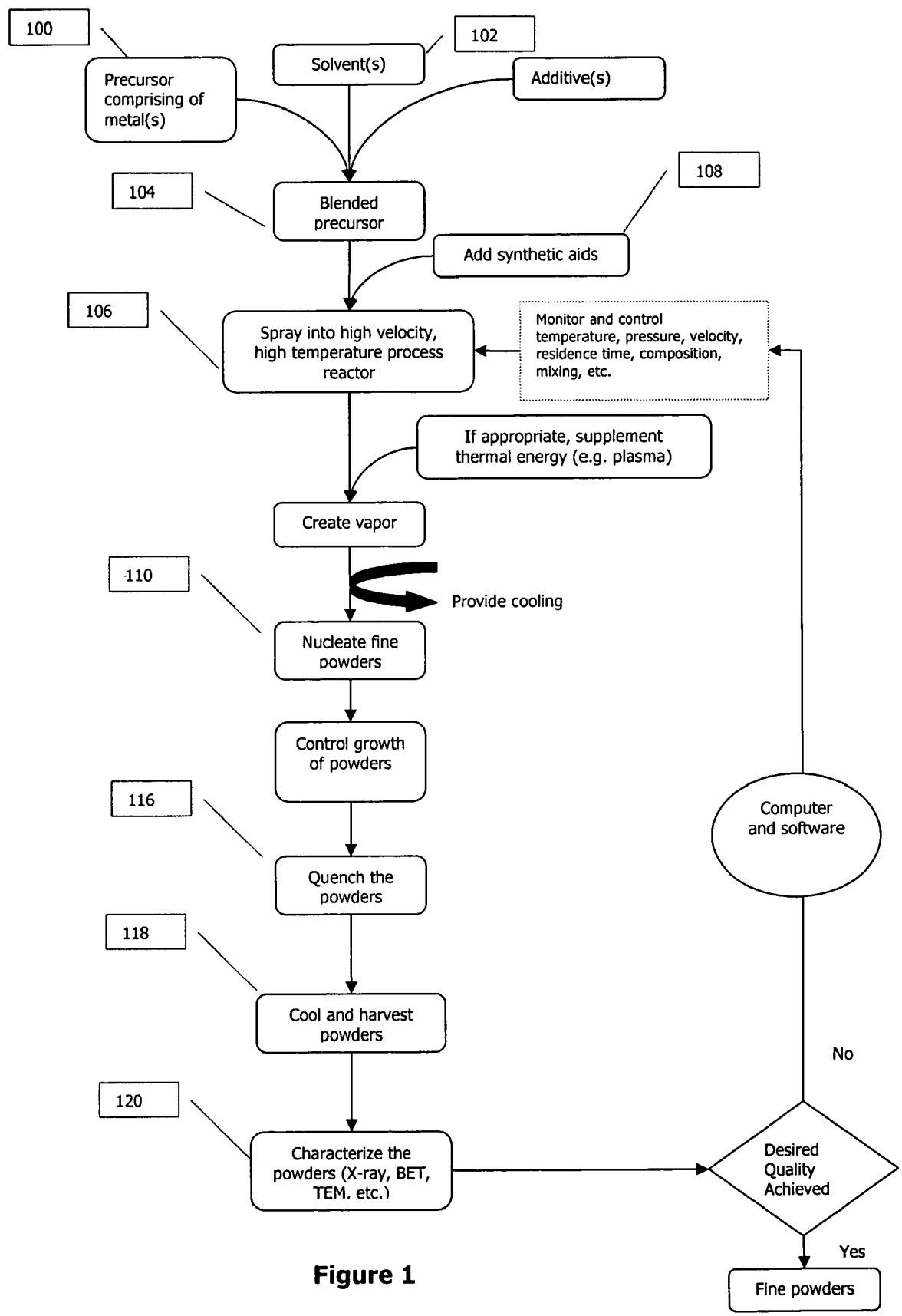
FIG. 1 shows an exemplary overall approach for producing submicron and nanoscale powders in accordance with the present invention.

This invention is generally directed to very fine powders comprising tungsten (W). The scope of the teachings includes high purity powders. Powders discussed herein are of mean crystallite size less than 1 micron, and in certain embodiments less than 100 nanometers. Methods for producing and utilizing such powders in high volume, low-cost, and reproducible quality are also outlined.

Definitions

For purposes of clarity, the following definitions are provided to aid the understanding of the description and specific examples provided herein. Whenever a range of values are provided for a specific variable, both the upper and lower limit of the range are included within the definition.

"Fine powders" as used herein, refers to powders that simultaneously satisfy the following criteria:

(1) particles with mean size less than 10 microns; and
(2) particles with aspect ratio between 1 and 1,000,000.
   For example, in some embodiments, the fine powders are powders that have particles with a mean domain size less than 5 microns and with an aspect ratio ranging from 1 to 1,000,000.

"Submicron powders" as used herein, refers to fine powders with a mean size less than 1 micron. For example, in some embodiments, the submicron powders are powders that have particles with a mean domain size less than 500 nanometers and with an aspect ratio ranging from 1 to 1,000,000.

The terms "nanopowders," "nanosize powders," "nanoparticles," and "nanoscale powders" are used interchangeably and refer to fine powders that have a mean size less than 250 nanometers. For example, in some embodiments, the nanopowders are powders that have particles with a mean domain size less than 100 nanometers and with an aspect ratio ranging from 1 to 1,000,000.

"Pure powders," as the term is used herein, are powders that have composition purity of at least 99.9% by metal basis. For example, in some embodiments the purity is 99.99%.

"Nanomaterials," as the term is used herein, are materials in any dimensional form that have a domain size less than 100 nanometers.

"Domain size," as that term is used herein, refers to the minimum dimension of a particular material morphology. In the case of powders, the domain size is the grain size. In the case of whiskers and fibers, the domain size is the diameter. In the case of plates and films, the domain size is the thickness.

The terms "powder," "particle," and "grain" are used interchangeably and encompass oxides, carbides, nitrides, borides, chalcogenides, halides, metals, intermetallics, ceramics, polymers, alloys, and combinations thereof. These terms include single metal, multi-metal, and complex compositions. These terms further include hollow, dense, porous, semi-porous, coated, uncoated, layered, laminated, simple, complex, dendritic, inorganic, organic, elemental, non-elemental, composite, doped, undoped, spherical, non-spherical, surface functionalized, surface non-functionalized, stoichiometric, and non-stoichiometric forms or substances. Further, the term powder in its generic sense includes one-dimensional materials (fibers, tubes, etc.), two-dimensional materials (platelets, films, laminates, planar, etc.), and three-dimensional materials (spheres, cones, ovals, cylindrical, cubes, monoclinic, parallelolipids, dumbbells, hexagonal, truncated dodecahedron, irregular shaped structures, etc.).

"Aspect ratio," as the term is used herein, refers to the ratio of the maximum to the minimum dimension of a particle.

"Precursor," as the term is used herein, encompasses any raw substance that can be transformed into a powder of same or different composition. In certain embodiments, the precursor is a liquid. The term precursor includes, but is not limited to, organometallics, organics, inorganics, solutions, dispersions, melts, sols, gels, emulsions, or mixtures.

"Powder," as the term is used herein, encompasses oxides, carbides, nitrides, chalcogenides, metals, alloys, and combinations thereof. The term includes hollow, dense, porous, semi-porous, coated, uncoated, layered, laminated, simple, complex, dendritic, inorganic, organic, elemental, non-elemental, dispersed, composite, doped, undoped, spherical, non-spherical, surface functionalized, surface non-functionalized, stoichiometric, and non-stoichiometric forms or substances.

"Coating" (or "film" or "laminate" or "layer"), as the term is used herein, encompasses any deposition comprising submicron and nanoscale powders. The term includes in its scope a substrate, surface, deposition, or a combination thereof that is hollow, dense, porous, semi-porous, coated, uncoated, simple, complex, dendritic, inorganic, organic, composite, doped, undoped, uniform, non-uniform, surface functionalized, surface non-functionalized, thin, thick, pretreated, post-treated, stoichiometric, or non-stoichiometric form or morphology.

"Dispersion," as the term is used herein, encompasses inks, pastes, creams, lotions, Newtonian, non-Newtonian, uniform, non-uniform, transparent, translucent, opaque, white, black, colored, emulsified, with additives, without additives, water-based, polar solvent-based, or non-polar solvent-based mixtures of powder in any fluid or fluid-like state.

In some embodiments, the present invention is directed to submicron and nanoscale powders comprising doped or undoped tungsten oxides. Given the relative abundance of tungsten in the earth's crust and current limitations on purification technologies, it is expected that many commercially produced materials would have naturally occurring tungsten impurities. These impurities are expected to be below 100 parts per million and in most cases in concentration similar to other elemental impurities. Removal of such impurities does not materially affect the properties of interest for an application. For the purposes herein, powders comprising tungsten impurities wherein tungsten is present in a concentration similar to other elemental impurities are excluded from the scope of this invention. However, it is emphasized that in one or more doped or undoped compositions of matter, tungsten may be intentionally engineered as a dopant into a powder at concentrations of 100 ppm or less, and these are included in the scope of this invention.

In a generic sense, the invention teaches nanoscale powders, and in more generic sense, submicron powders comprising at least 100 ppm by weight, in some embodiments greater than 1 weight % by metal basis, and in other embodiments greater than 10 weight % by metal basis, of tungsten (W).

While several embodiments for manufacturing nanoscale and submicron powders comprising tungsten are disclosed, for the purposes herein, the nanoscale or submicron powders may be produced by any method or may result as a byproduct from any process.

FIG. 1 shows an exemplary overall approach for the production of submicron powders in general and nanopowders in particular. The process shown in FIG. 1 begins with a tungsten containing raw material (for example, but not limited to, coarse oxide powders, metal powders, salts, slurries, waste products, organic compounds, or inorganic compounds). FIG. 1 shows one embodiment of a system for producing nanoscale and submicron powders in accordance with the present invention.

The process shown in FIG. 1 begins at 100 with a tungsten metal-containing precursor such as an emulsion, fluid, particle-containing fluid suspension, or water-soluble salt. The precursor may be evaporated tungsten metal vapor, evaporated alloy vapor, a gas, a single-phase liquid, a multi-phase liquid, a melt, a sol, a solution, fluid mixtures, solid suspension, or combinations thereof. The metal-containing precursor comprises a stoichiometric or a non-stoichiometric metal composition with at least some part in a fluid phase. Fluid precursors are utilized in certain embodiments of this invention. Typically, fluids are easier to convey, evaporate, and thermally process resulting in a more uniform product.

In one embodiment of this invention, the precursors are environmentally benign, safe, readily available, high-metal loading, lower-cost, fluid materials. Examples of tungsten metal-containing precursors include, but are not limited to, metal acetates, metal carboxylates, metal ethanoates, metal alkoxides, metal octoates, metal chelates, metallo-organic compounds, metal halides, metal azides, metal nitrates, metal sulfates, metal hydroxides, metal salts soluble in organics or water, compounds of the metal, comprising ammonium compounds of the metal comprising sodium/potassium/lithium, and metal-containing emulsions.

In another embodiment, multiple metal precursors may be mixed if complex nano-nanoscale and submicron powders are desired. For example, a tungsten precursor and alkali (or alkaline earth) precursor may be mixed to prepare sodium tungsten oxide powders for color and for electroceramic applications. As another example, a tungsten precursor, a vanadium precursor and titanium precursor may be mixed in correct proportions to yield a high purity, high surface area, mixed oxide powder for catalyst applications. In yet another example, a barium precursor (and/or zinc precursor) and a tungsten precursor may be mixed to yield powders for pigment applications. Such complex nanoscale and submicron powders can help create materials with surprising and unusual properties not available through the respective single metal oxides or a simple nanocomposite formed by physically blending powders of different compositions.

It is desirable to use precursors of a higher purity to produce a nanoscale or submicron powder of a desired purity. For example, if a purity greater than x% (by metal weight basis) is desired, one or more precursors that are mixed and used may have purities greater than or equal to x% (by metal weight basis).

With continued reference to FIG. 1, the metal-containing precursor 100 (containing one or a mixture of metal-containing precursors) is fed into a high temperature process 106, which may be implemented using a high temperature reactor, for example. In some embodiments, a synthetic aid such as a reactive fluid 108 may be added along with the precursor 100 as it is being fed into the reactor 106. Examples of such reactive fluids include, but are not limited to, hydrogen, ammonia, halides, carbon oxides, methane, oxygen gas, and air.

While the discussion herein teaches methods of preparing nanoscale and submicron powders of oxides, the teachings may be readily extended in an analogous manner to other compositions such as carbides, nitrides, borides, carbonitrides, and chalcogenides. These compositions can be prepared from micron-sized powder precursors of these compositions or by utilizing reactive fluids that provide the elements desired in these tungsten comprising compositions. In some embodiments, high temperature processing may be used. However, a moderate temperature processing or a low/cryogenic temperature processing may also be employed to produce nanoscale and submicron powders using the methods of the present invention.

The precursor 100 may be pre-processed in a number of other ways before any thermal treatment. For example, the pH may be adjusted to ensure precursor stability. Alternatively, selective solution chemistry, such as precipitation with or without the presence of surfactants or other synthesis aids, may be employed to form a sol or other state of matter. The precursor 100 may be pre-heated or partially combusted before the thermal treatment.

The precursor 100 may be injected axially, radially, tangentially, or at any other angle into the high temperature region 106. As stated above, the precursor 100 may be pre-mixed or diffusionally mixed with other reactants. The precursor 100 may be fed into the thermal processing reactor by a laminar, parabolic, turbulent, pulsating, sheared, or cyclonic flow pattern, or by any other flow pattern. In addition, one or more metal-containing precursors 100 can be injected from one or more ports in the reactor 106. The feed spray system may yield a feed pattern that envelops the heat source or, alternatively, the heat sources may envelop the feed, or alternatively, various combinations of this may be employed. In some embodiments, the spray is atomized and sprayed in a manner that enhances heat transfer efficiency, mass transfer efficiency, momentum transfer efficiency, and reaction efficiency. The reactor shape may be cylindrical, spherical, conical, or any other shape. Methods and equipment such as those taught in U.S. Pat. Nos. 5,788,738, 5,851,507, and 5,984,997 (each of which is hereby specifically incorporated by reference in its entirety) can be employed.

With continued reference to FIG. 1, after the precursor 100 has been fed into reactor 106, it may be processed at high temperatures to form the product powder. In other embodiments, the thermal processing may be performed at lower temperatures to form the powder product. The thermal treatment may be done in a gas environment with the aim to produce products, such as powders, that have the desired porosity, density, morphology, dispersion, surface area, and composition. This step produces by-products, such as gases. To reduce costs, these gases may be recycled, mass/heat integrated, or used to prepare the pure gas stream desired by the process.

In embodiments using high temperature thermal processing, the high temperature processing may be conducted at step 106 (FIG. 1) at temperatures greater than 1500 K, in some embodiments greater than 2500 K, in some embodiments greater than 3000 K, and in some embodiments greater than 4000 K. Such temperatures may be achieved by various methods including, but not limited to, plasma processes, combustion in air, combustion in purified oxygen or oxygen rich gases, combustion with oxidants, pyrolysis, electrical arcing in an appropriate reactor, and combinations thereof. The plasma may provide reaction gases or may provide a clean source of heat.

A high temperature thermal process at 106 results in a vapor comprising the metal(s) in one or more phases. After the thermal processing, this vapor is cooled at step 110 to nucleate submicron powders, in certain embodiments nanopowders. In certain embodiments, the cooling temperature at step 110 is maintained high enough to prevent moisture condensation. The dispersed particles form because of the thermokinetic conditions in the process. By engineering the process conditions, such as pressure, residence time, supersaturation and nucleation rates, gas velocity, flow rates, species concentrations, diluent addition, degree of mixing, momentum transfer, mass transfer, and heat transfer, the morphology of the nanoscale and submicron powders can be tailored. It is important to note that the focus of the process should be on producing a powder product that excels in satisfying the end application requirements and customer needs.

In certain embodiments, the nanopowder is quenched after cooling to lower temperatures at step 116 to minimize and prevent agglomeration or grain growth. Suitable quenching methods include, but are not limited to, methods taught in U.S. Pat. No. 5,788,738. In certain embodiments, sonic to supersonic quenching may be used. In other embodiments, coolant gases, water, solvents, cold surfaces, or cryogenic fluids might be employed. In certain embodiments, quenching methods are employed which can prevent deposition of the powders on the conveying walls. Suitable methods include, but are not limited to, electrostatic means, blanketing with gases, the use of higher flow rates, mechanical means, chemical means, electrochemical means, or sonication/vibration of the walls.

In some embodiments, the high temperature processing system includes instrumentation and software that can assist in the quality control of the process. Furthermore, in certain embodiments, the high temperature processing zone 106 is operated to produce fine powders 120, in certain embodiments submicron powders, and in certain embodiments nanopowders. The gaseous products from the process may be monitored for composition, temperature, and other variables to ensure quality at step 112 (FIG. 1). The gaseous products may be recycled to be used in process 108 or used as a valuable raw material when nanoscale and submicron powders 120 have been formed, or they may be treated to remove environmental pollutants if any. Following quenching step 116, the nanoscale and submicron powders may be cooled further at step 118 and then harvested at step 120.

The product nanoscale and submicron powders 120 may be collected by any method. Suitable collection means include, but are not limited to, bag filtration, electrostatic separation, membrane filtration, cyclones, impact filtration, centrifugation, hydrocyclones, thermophoresis, magnetic separation, and combinations thereof.

The quenching at step 116 may be modified to enable preparation of coatings. In such embodiments, a substrate may be provided (in batch or continuous mode) in the path of the quenching powder containing gas flow. By engineering the substrate temperature and the powder temperature, a coating comprising the submicron powders and nanoscale powders can be formed.

In some embodiments, a coating, film, or component may also be prepared by dispersing the fine nanopowder and then applying various known methods, such as, but not limited to, electrophoretic deposition, magnetophorectic deposition, spin coating, dip coating, spraying, brushing, screen printing, ink-jet printing, toner printing, and sintering. The nanopowders may be thermally treated or reacted to enhance their electrical, optical, photonic, catalytic, thermal, magnetic, structural, electronic, emission, processing, or forming properties before such a step.

It should be noted that the intermediate or product at any stage of the process described herein, or similar process based on modifications by those skilled in the art, may be used directly as a feed precursor to produce nanoscale or fine powders by methods taught herein and other methods. Other suitable methods include, but not limited to, those taught in commonly owned U.S. Pat. Nos. 5,788,738, 5,851,507, and 5,984,997, and co-pending U.S. patent application Ser. Nos. 09/638,977 and 60/310,967 which are all incorporated herein by reference in their entirety. For example, a sol may be blended with a fuel and then utilized as the feed precursor mixture for thermal processing above 2500 K to produce nanoscale simple or complex powders.

In summary, one embodiment for manufacturing powders comprises (a) preparing a precursor comprising at least 100 ppm by weight of tungsten element; (b) feeding the precursor into a high temperature reactor operating at temperatures greater than 1500 K, in certain embodiments greater than 2500 K, in certain embodiments greater than 3000 K, and in certain embodiments greater than 4000 K; (c) wherein, in the high temperature reactor, the precursor converts into vapor comprising the rare earth metal in a process stream with a velocity above 0.25 mach in an inert or reactive atmosphere; (d) cooling the vapor to nucleate submicron or nanoscale powders; (e) quenching the powders at high gas velocities to prevent agglomeration and growth; and (f) filtering the quenched powders from the gases.

Another embodiment for manufacturing nanoscale powders comprising tungsten comprises (a) preparing a fluid precursor comprising two or more metals, at least one of which is tungsten in a concentration greater than 100 ppm by weight; (b) feeding the said precursor into a high temperature reactor operating at temperatures greater than 1500 K, in some embodiments greater than 2500 K, in some embodiments greater than 3000 K, and in some embodiments greater than 4000 K in an inert or reactive atmosphere; (c) wherein, in the said high temperature reactor, the said precursor converts into vapor comprising tungsten; (d) cooling the vapor to nucleate submicron or nanoscale powders; (e) quenching the powders at gas velocities exceeding 0.1 Mach to prevent agglomeration and growth; and (f) separating the quenched powders from the gases. In certain embodiments, the fluid precursor may include synthesis aids, such as surfactants (also known as dispersants, capping agents, emulsifying agents, etc.), to control the morphology or to optimize the process economics and/or product performance.

One embodiment for manufacturing coatings comprises (a) preparing a fluid precursor comprising one or more metals, one of which is tungsten; (b) feeding the precursor into a high temperature reactor operating at temperatures greater than 1500 K, in some embodiments greater than 2500 K, in some embodiments greater than 3000 K, and in some embodiments greater than 4000 K in an inert or reactive atmosphere; (c) wherein, in the high temperature reactor, the precursor converts into vapor comprising tungsten; (d) cooling the vapor to nucleate submicron or nanoscale powders; (e) quenching the powders onto a substrate to form a coating on the substrate comprising tungsten.

The powders produced by teachings herein may be modified by post-processing as taught by commonly owned U.S. patent application Ser. No. 10/113,315, which is hereby incorporated by reference in its entirety.

Methods for Incorporating Nanoparticles into Products

Submicron and nanoscale powders can be incorporated into a composite structure by any method. Some non-limiting exemplary methods are taught in commonly owned U.S. Pat. No. 6,228,904 which is hereby incorporated by reference in its entirety.

The submicron and nanoscale powders taught herein may be incorporated into plastics by any method. In one embodiment, the method comprises (a) preparing nanoscale or submicron powders comprising tungsten by any method, such as a method that employs fluid precursors and a peak processing temperature exceeding 1500 K; (b) providing powders of one or more plastics; (c) mixing the nanoscale or submicron powders with the powders of plastics; and (d) co-extruding the mixed powders into a desired shape at temperatures greater than the softening temperature of the powders of plastics but less than the degradation temperature of the powders of plastics. In another embodiment, a masterbatch of the plastic powder comprising nanoscale or submicron powders comprising tungsten is prepared. These masterbatches can later be processed into useful products by techniques well known to those skilled in the art. In yet another embodiment, the tungsten metal containing nanoscale or submicron powders are pretreated to coat the powder surface for ease in dispersability and to ensure homogeneity. In a further embodiment, injection molding of the mixed powders comprising nanoscale powders and plastic powders is employed to prepare useful products.

One embodiment for incorporating nanoscale or submicron powders into plastics comprises (a) preparing nanoscale or submicron powders comprising tungsten by any method, such as a method that employs fluid precursors and peak processing temperature exceeding 1500 K; (b) providing a film of one or more plastics, wherein the film may be laminated, extruded, blown, cast, or molded; and (c) coating the nanoscale or submicron powders on the film of plastic by techniques such as spin coating, dip coating, spray coating, ion beam coating, sputtering. In another embodiment, a nanostructured coating is formed directly on the film by techniques such as those taught in herein. In some embodiments, the grain size of the coating is less than 200 nm, in some embodiments less than 75 nm, and in some embodiments less than 25 nm.

Submicron and nanoscale powders can be incorporated into glass by any method. In one embodiment, nanoparticles of tungsten are incorporated into glass by (a) preparing nanoscale or submicron powders comprising tungsten by any method, such as a method that employs fluid precursors and temperature exceeding 1500 K in an inert or reactive atmosphere; (b) providing glass powder or melt; (c) mixing the nanoscale or submicron powders with the glass powder or melt; and (d) processing the glass comprising nanoparticles into articles of desired shape and size.

Submicron and nanoscale powders can be incorporated into paper by any method. In one embodiment, the method comprises (a) preparing nanoscale or submicron powders comprising tungsten; (b) providing paper pulp; (c) mixing the nanoscale or submicron powders with the paper pulp; and (d) processing the mixed powders into paper, such as by molding, couching and calendering. In another embodiment, the tungsten metal containing nanoscale or submicron powders are pretreated to coat the powder surface for ease in dispersability and to ensure homogeneity. In a further embodiment, nanoparticles are applied directly on the manufactured paper or paper-based product; the small size of nanoparticles enables them to permeate through the paper fabric or reside on the surface of the paper and thereby functionalize the paper.

The submicron and nanoscale powders taught herein may be incorporated into leather, fibers, or fabric by any method. In one embodiment, the method comprises (a) preparing nanoscale or submicron powders comprising tungsten by any method, such as a process that includes a step that operates above 1000 K; (b) providing leather, fibers, or fabric; (c) bonding the nanoscale or submicron powders with the leather, fibers, or fabric; and (d) processing the bonded leather, fibers, or fabric into a product. In yet another embodiment, the tungsten metal containing nanoscale or submicron powders are pretreated to coat or functionalize the powder surface for ease in bonding or dispersability or to ensure homogeneity. In a further embodiment, nanoparticles are applied directly on a manufactured product based on leather, fibers, or fabric; the small size of nanoparticles enables them to adhere to or permeate through the leather, fibers (polymer, wool, cotton, flax, animal-derived, agri-derived), or fabric and thereby functionalize the leather, fibers, or fabric.

Submicron and nanoscale powders can be incorporated into creams or inks by any method. In one embodiment, the method comprises (a) preparing nanoscale or submicron powders comprising tungsten by any method, such as a method that employs fluid precursors and peak processing temperatures exceeding 1500 K; (b) providing a formulation of cream or ink; and (c) mixing the nanoscale or submicron powders with the cream or ink. In yet another embodiment, the tungsten comprising nanoscale or submicron powders are pretreated to coat or functionalize the powder surface for ease in dispersability and to ensure homogeneity. In a further embodiment, pre-existing formulation of a cream or ink is mixed with nanoscale or submicron powders to functionalize the cream or ink.

Nanoparticles comprising tungsten can be difficult to disperse in water, solvents, plastics, rubber, glass, paper, etc. The dispersability of the nanoparticles can be enhanced in certain embodiments by treating the surface of the tungsten oxide powders or other tungsten comprising nanoparticles. The treatment step may lead to physical bonding in certain embodiments. In other embodiments, the treatment step may lead to chemical bonding of desirable functional groups to the surface of the nanoparticles. For example, fatty acids (e.g. propionic acid, stearic acid and oils) or organometallics comprising silicon or organometallics comprising titanium can be applied to or with the nanoparticles to enhance the surface compatibility. If the powder has an acidic surface, ammonia, quaternary salts, or ammonium salts can be applied to the surface to achieve desired surface pH. In other cases, acetic acid wash can be used to achieve the desired surface state. Trialkyl phosphates and phosphoric acid can be applied to reduce dusting and chemical activity. In yet other cases, the powder may be thermally treated to improve the dispersability of the powder.

Applications of Nanoparticles and Submicron Powders Comprising Tungsten

Pigments

Nanoparticles comprising tungsten containing multi-metal oxides offer some surprising and unusual benefits as pigments. Nanoparticles are smaller than the visible wavelengths of light which leads to visible wavelengths interacting in unusual ways with nanoparticles compared to particles with grain sizes much bigger than the visible wavelengths (400-700 nm). The small size of nanoparticles can also lead to more uniform dispersion. In certain embodiments, it is important that the nanoparticles be non-agglomerated (i.e. do not have sintered neck formation or hard agglomeration). In some embodiments, the nanoparticles have non-functionalized, i.e. clean surface; in other embodiments, the surface is modified or functionalized to enable bonding with the matrix in which they need to be dispersed.

One of the outstanding process challenges for manufacturing inorganic pigments is the ability to ensure homogeneous lattice level mixing of elements in a complex multi-metal formulation. One of the features of the process described herein is its ability to prepare complex compositions with the necessary homogeneity. Therefore, the teachings herein are ideally suited for creating color and making superior performing pigments with nanoparticles comprising tungsten.

Some non-limiting illustrations of pigments containing tungsten are barium tungsten oxide, zinc tungsten oxide, calcium tungsten oxide, tin doped tungsten oxide, tungsten bronzes, phosphotungstomolybdic acid, and non-stoichiometric substances comprising tungsten.

In one embodiment, a method for manufacturing a pigmented product comprises (a) preparing nanoscale or submicron powders comprising tungsten; (b) providing powders of one or more plastics; (c) mixing the nanoscale or submicron powders with the powders of plastics; and (d) processing the mixed powders into the product. In yet another embodiment, the tungsten containing nanoscale or submicron powders are pretreated to coat the powder surface for ease in dispersability and to ensure homogeneity. In a further embodiment, extrusion or injection molding of the mixed powders comprising nanoscale powders and plastic powders can be employed to prepare useful products.

Additives

Nanoscale tungsten comprising substances are useful lubricating additives. A non-limiting illustration is tungsten disulfide nanoparticles. The small size of tungsten disulfide nanoparticles enables thinner films in certain embodiments offering reduced costs at higher performance. Such lubricating nanoparticles, in certain better embodiments, offer ability to distribute forces more uniformly. In certain embodiments such as high precision, tight gap moving surfaces, lubricating additives may be added to the lubricating fluid or oils to improve the life or motor or engine. The unusual characteristic that makes lubricating nanoparticle additives useful is that the particle size enables by nanotechnology can be less than the naturally occurring characteristic roughness sizes. The nanoparticles can enter and buffer (or reside) in crevices, troughs thereby reducing the damaging internal pressures, forces and inefficient thermal effects. These additives can be dispersed in existing or novel lubricating formulations and thereby provide an easy way to incorporate the benefits of nanotechnology. Tungsten disulfide, molybdenum disulfide, molybdenum tungsten sulfide and such inorganic or organic nanoparticle composition are useful lubricating additives elsewhere as well, e.g. shaving blades and any surface that requires minimization of the adverse effects of friction.

Biochemical Analytical Agent

Sodium tungsten oxide nanoparticles, in high purity form in certain embodiments, are useful in biochemical analysis. The high surface area of nanoparticles comprising tungsten, particularly when the mean particle size is less than 100 nanometers, make them useful in these applications.

Sulfur and Carbon Accelerating Analytical Agent

Tungsten nanoparticles, in metallic form in certain embodiments, are useful in the analysis of carbon and sulfur by combustion in an induction furnace. The high surface area and surface activity of nanoparticles comprising tungsten, particularly when the mean particle size is less than 100 nanometers, make them useful in these applications.

Electrical & Lighting Applications

Nanomaterials comprising tungsten offer several unusual benefits as electron emitters. These benefits are a consequence of (a) the small size of nanoparticles which can enable very thin film devices, (b) high surface area, which can lower the sintering temperatures and sintering times, (c) inherently low vapor pressure of tungsten metal even at high temperatures and (d) unusual quantum confinement and grain boundary effects. These properties can be used to prepare improved electron emitting devices and electrical contacts. Photocopiers, facsimile machines, laser printers and air cleaners can benefit from charger wires prepared from tungsten comprising nanomaterials. Other nanodevices that can be prepared from nanoscale powders comprising tungsten include electrodes, chemical sensors, biomedical sensors, phosphors, and anti-static coatings. Tungsten comprising nanomaterials also offer novel compositions for chemical mechanical polishing applications.

For reasons described above, nanomaterials comprising tungsten are in certain embodiments particularly useful at direct heated cathode or heater coils for indirectly heated cathodes in cathode ray tubes, displays, x-ray tubes, klystrons, magnetrons for microwave ovens and electron tubes. Multimetal nanomaterial compositions comprising tungsten include those based on rare earths and thoria for high intensity discharge lamps and welding electrodes. X-ray device anodes can also benefit from the low vapor pressure and thermal conductivity of tungsten comprising nanomaterials.

The unusual combination of vapor pressure, electrical conductivity and electronic properties make nanomaterial compositions comprising tungsten useful as substrate for high power semiconductor rectifying devices, high voltage breakers (e.g. W—Cu, W—Ag contacts). In other embodiments, various forms of infiltrated tungsten comprising nanocomposites are useful for these applications. High temperature furnace parts such as heating coils, reflectors, thermocouples can also benefit from the quantum confined and low vapor pressure characteristics of nanomaterials comprising tungsten.

Nanomaterials comprising tungsten are useful for lighting applications (incandescent lamps) because of the same unusual combination of properties discussed above. Illustrative applications include household lamps, automotive lamps, and reflector lamps for floodlight or projector applications. Specialty lamps can also benefit from the nanotechnology taught herein in applications such as, but not limited to, audio-visual projectors, fiber-optical systems, video camera lights, airport runway markers, photoprinters, medical and scientific instruments, and stage or studio systems. In certain embodiments of lighting product and applications, alloys and dispersion strengthened forms of tungsten comprising materials are useful.

Electronics Applications

Nanomaterials comprising tungsten are useful in certain embodiments as phosphors and electronic materials. These benefits are a consequence of (a) the small size of nanoparticles which can enable very thin film devices, (b) high surface area which can lower the sintering temperatures and sintering times, (c) inherently low vapor pressure of tungsten metal even at high temperatures, (d) significant thermal and electrical conductivity, and (e) unusual quantum confinement and grain boundary effects. These properties can be used to prepare improved phosphors for x-rays (e.g. calcium tungsten oxide, magnesium tungsten oxide). Improved and more cost effective heat removal components comprising of tungsten and copper based heat sinks can be prepared from nanomaterials. Tungsten comprising nanomaterials inks (water, solvent or UV curable), adhesives and pastes can be useful in developing electrodes and conductors for ceramic circuit board and other applications.

For silicon based semiconductor devices, tungsten nanomaterials offer a close thermal coefficient of expansion. In combination with other useful properties mentioned above, tungsten and complex compositions comprising tungsten offer materials that can help achieve a thermal coefficient of expansion similar to compositions comprising silicon and metals used in microelectronics. These properties can be used to prepare improved microelectronic components. Tungsten comprising nanomaterials inks and pastes can be useful in preparing improved DRAM chips, other silicon devices, and liquid crystal display products.

Any method can be employed to utilize nanoparticles comprising tungsten in electronic devices taught herein. In one embodiment, a method for employing nanoparticles comprising tungsten in miniature batteries comprises (a) preparing nanoscale or submicron powders comprising tungsten; (b) preparing an ink (water based, solvent based or UV curable monomer based ink) or adhesive or paste from the powders; and (c) utilizing the ink or adhesive or paste to prepare an electronic device.

Catalysts

Tungsten containing nanoparticles such as oxides, sulfides and heteropoly complexes are useful catalysts for a number of chemical reactions. For example, they can be used in hydration, dehydration, hydroxylation, and epoxidation reactions as catalysts or promoters. In one embodiment, a method for producing catalysts or promoters comprises (a) preparing nanoscale powders comprising tungsten such that the surface area of the said powder is greater than 25 square meters per gram, in some embodiments greater than 75 square meters per gram, and in some embodiments greater than 150 square meters per gram; and (b) reducing the powder in a reducing environment (or activating the powder in any other way) and then conducting a chemical reaction in the presence of the nanoscale powders comprising doped or undoped tungsten compound. In some embodiments, a further step of dispersing the nanoscale powders in a solvent and then depositing these powders onto a substrate from the dispersion may be employed before chemical reaction is conducted.

The catalyst powders described above can be combined with zeolites and other well-defined porous materials to enhance the selectivity and yields of useful chemical reactions.

Optics and Phosphors

Non-stoichiometric nanoparticles comprising tungsten offer several unusual benefits as phosphors and for detector applications. These benefits are a consequence of one or more of the following characteristics (a) small size, (b) high surface area, (c) dispersability in various media, inks, and solid matrices, (e) unusual and complex combinations of density, vapor pressures, work functions, and band gaps. The advantages of phosphors and detectors comprising tungsten-containing nanoparticles are (a) high dots per inch density, (b) ability to form homogeneous products, and (c) the ability to prepare very thin films thereby reducing the raw material required for same or superior performance. Nanoparticles can also be post-processed (calcination, sintering) to grow the grain to the optimal size in order to provide the brightness level, decay time and other characteristics desired.

Multi-metal compositions (two, three, four, or more metals) comprising tungsten are used in certain embodiments. A specific illustration of fluorescent composition is calcium tungstate. These phosphor nanopowders can be used for scintillation counters, display applications, lamps, fluorescent bulbs, light emitting devices, markers, security pigments, fabric pigments, luminous paints, toys, special effects, etc.

Tungsten comprising nanoparticles are useful in forming thin films comprising tungsten that lose oxygen in bright light thereby becoming bluish and filtering light; these films reoxidize in darkness thereby becoming clear. One of the many useful properties of nanomaterials comprising tungsten is the ability of tungsten to lose oxygen easily (e.g. $WO_3$—$W_{20}O_{58}$ transition).

Interstitial Compounds

Interstitial compounds comprising tungsten (e.g. carbide, nitrides, borides, silicides) offer several unusual benefits in hard, refractory applications. These benefits are a consequence of one or more of the following characteristics (a) size, (b) hardness, (c) size confinement, (e) unusual and complex combinations of density, vapor pressures, and physical properties. Nanoparticles can also be post-processed (calcination, sintering) to grow the grain to the optimal size in order to provide other characteristics as desired. Interstitial nanomaterial compositions comprising tungsten (and other metal(s)) are useful in cutting tools, structural elements of kilns, turbines, engines, sandblast nozzles, protective coatings and the like.

Reagent and Raw Material for Synthesis

Nanoparticles comprising tungsten such as tungsten oxide and tungsten containing multi-metal oxide nanoparticles are useful reagents and precursors to prepare other compositions of nanoparticles comprising tungsten. In a generic sense, nanoparticles comprising tungsten are reacted with another substance, i.e., reagent, such as, but not limited to, an acid, alkali, organic, monomer, ammonia, reducing fluids, oxidizing fluids, halogens, phosphorus compounds, chalcogenides, biological materials, gas, vapor or solvent; the high surface area of nanoparticles facilitates the reaction and the product resulting from this reaction is also nanoparticles. The reagent can take any suitable form and can comprise nitrogen, a halogen, hydrogen, carbon, or oxygen.

These product nanoparticles can then be suitably applied or utilized to catalyze or as reagents to prepare other fine chemicals for a wide range of applications. A few non-limiting illustrations utilizing tungsten comprising nanoparticles follow. These teachings can be extended to multi-metal oxides and to other compositions such as tungsten interstitial compounds and organometallics based on tungsten. In certain embodiments, the nanoparticles may be treated or functionalized or activated under various temperatures, pressure, charge or environment composition before use.

Tungsten: Tungsten oxide nanoparticles are reacted with carbon or reacted with hydrogen comprising reducing gases at temperatures above 450° C. to produce nanoparticles of tungsten. In certain embodiments, lower temperatures may be used. If other embodiments, heating the nanocrystals in a vacuum or ambient pressures or higher pressures at temperatures such as 800 K, 1200 K, etc. may be used. Tungsten metal nanoparticles are useful in many applications (such as forming tungsten metal wire for filaments, etc.) and as a precursor for forming other compositions of matter comprising tungsten.

An embodiment for producing nanoparticles comprising tungsten comprises (a) preparing nanoscale powders comprising tungsten oxide (b) reacting the nanoscale powders with a reducing compound or environment; and (c) collecting resultant nanoparticles comprising tungsten. The higher surface area of tungsten comprising nanomaterials enables surprisingly lower temperatures and times for the conversion. In certain embodiments, the processing temperatures and times are lowered by at least 10%. In certain embodiments, the processing temperatures and times are lowered by at least 30%. In certain embodiments, the processing temperatures and times are lowered by at least 50%. In certain embodiments, the processing temperatures and times are lowered by at least 70%.

Tungsten Halides: Tungsten comprising nanoparticles are reacted with a halogen comprising compound to form tungsten halide comprising compounds. To illustrate, but not limit, tungsten nanoparticles are chlorinated to prepare $WCl_6$ bluish black crystalline solid nanoparticles. The chlorination is performed above 400° C. and 100-1000 Torr in one embodiment (other combinations of T and P may be used in other embodiments). In certain embodiments, volume expansion with phase transformation is taken care by providing excess volume. By addition of oxygen or moisture during chlorination, oxychlorides of tungsten may be formed. Tungsten fluoride is prepared in one embodiment by reacting fluorine with tungsten nanoparticles. Tungsten bromide, $WBr_6$, is formed in certain embodiments by exchange reactions such as those between $BBr_3$ with $WCl_6$ nanoparticles. In another embodiment, $WBr_5$ is formed by reacting bromine vapor with tungsten nanoparticles above 350° C. Oxyfluorides (e.g. $WOF_4$), which are extremely hygroscopic, can be formed by reacting oxygen-fluorine mixtures with tungsten metal nanoparticles. In other embodiments, mixing tungsten, tungsten oxide and excess iodine followed by reaction above 300° C. yields tungsten oxydiiodide ($WO_2I_2$).

Tungsten suboxides: Tungsten oxide ($WO_3$ yellow) nanoparticles can be reacted with reducing compounds such as hydrogen to produce nanoparticles of tungsten suboxides (e.g. $WO_{1.63-2.99}$). The suboxides possess different colors than the stoichiometric trioxide form (e.g. green yellow, blue, brown). Further reductions yield $W_3O$, which is grayish and offers properties of both an oxide and those of a metallic compound.

Tungsten bronzes: Tungsten bronze nanoparticles can be represented by the generic formula $M_{1-x}WO_3$. The M in this generic formula can be an alkali metal (Na, K, Cs) or any other metal. The x in the generic formula can be zero or any number greater than zero and less than one. Tungsten bronze nanoparticles can be prepared by reacting tungsten oxide nanoparticles with any compound of M. In some embodiments, this is an oxide of metal M, a hydroxide of M, or metal M. In other embodiments, other compositions can be employed. The reaction may be assisted by high temperatures, vacuum, high pressures, gas environment, such as hydrogen or carbon comprising species or oxygen or inert. Other methods for preparing tungsten bronze nanoparticles include electrolytic reduction, fusion, solid state reactions, co-condensation, vapor phase deposition, sputtering and the like. In some embodiments, nanoparticles of various constituents are used to enable cost effective manufacturing with uniform properties.

Tungsten bronze nanoparticles offer unusual properties. To illustrate, but not limit, sodium tungsten bronzes offer positive temperature coefficient of resistance when $x > x_c$, and negative temperature coefficient of resistance when $x < x_c$. The $x_c$ depends on the particle size, oxygen deficiency and other nanoparticle characteristics. For example, $x_c$ is 0.3 in certain embodiments and 0.6 in other embodiments and may be another number in other embodiments. Nanoparticles comprising sodium tungsten bronzes offer intense color with metallic sheen depending on the value of x in $Na_{1-x}WO_3$. These and other nanoparticles comprising tungsten can be combined with mica or other platelets to provide special effect pigments. Nanoparticles of tungsten bronzes are also useful as catalysts for oxidation reactions and fuel cell applications.

Mixed metal tungsten compounds: Tungsten metal nanoparticles or tungsten oxide nanoparticles can be reacted with other nanoparticles comprising metal to produce nanoparticles of mixed metal compounds comprising tungsten. Examples of such compounds include but are not limited to, $BaWO_4$, $CdWO_4$, $CaWO_4$, $SrWO_4$, $PbWO_4$, $Na_2WO_4$, $Ce_2(WO_4)_3$, etc. Alternatively, as discussed previously, mixed metal compositions such as these tungstates can also be directly prepared from precursors. Tungstate nanoparticles are useful materials for optical, electronic, catalyst, pigment, and other applications. Ceramics, corrosion resistance, and fire inhibition formulations can also benefit from the unusual surface activity, small size, and other properties of tungstate nanomaterials.

Polytungstate compounds: Tungstates, as discussed above, show unusual polytungstate nanocluster forming characteristics when certain formulation conditions, such as pH, are varied. Metatungstate, paratungstate, heteropolyanions, isopolyanions, etc. can be prepared by adjusting pH, mixing in organic acids, monomers and the like. Heteropolytungstate nanoparticles such as those comprising K, Co, P, Ce, rare earths and large cations are useful as catalysts, passivation of metals and alloys, and as precipitants for colored lakes, toners and dye manufacturing.

EXAMPLES 1-2

Tungsten Oxide Powders

Ammonium tungstate precursor was dissolved in a 50:50 water and isopropyl alcohol mix. This mix was sprayed into a DC thermal plasma reactor described herein at a rate of about 100 ml/min using about 150 standard liters per minute oxygen. The peak temperature in the thermal plasma reactor was above 3000 K. The vapor was cooled to nucleate nanoparticles and then quenched by Joule-Thompson expansion. The powders collected were analyzed using X-ray diffraction (Warren-Averbach analysis) and BET. It was discovered that the powders had a crystallite size of less than 100 nm and a specific surface area greater than 10 $m^2$/gm. It was also found that the nanopowders were readily dispersible in water, polar solvents, non-polar solvents and UV curable monomers confirming that inks can be readily prepared with these nanoscale powders.

Next, in a separate run with the same process, the mix was sprayed at a rate of about 75 ml/min using about 150 standard liters per minute oxygen. The peak temperature in the thermal plasma reactor was above 3000 K. The vapor was cooled and then quenched by Joule-Thompson expansion. The powders collected were analyzed using X-ray diffraction (Warren-Averbach analysis) and BET. It was discovered that the powders had a crystallite size less than 75 nm and a specific surface area of greater than 15 $m^2$/gm.

These examples show that nanoparticles comprising tungsten can be prepared and that the characteristics of tungsten oxide powder can be varied with process variations.

EXAMPLE 3

Tungsten Tin Oxide Powders

A mixture comprising ammonium metatungsate and tin organometallic compound were processed in a thermal quench reactor with a peak temperature above 2000 K. The vapor was cooled and then quenched by Joule-Thompson expansion. It was discovered that the powders had an average crystallite size of less than 40 nm. The color of the powder was observed to be a beautiful blue. This example shows that the thermal plasma process can be used to create blue color nanopigments.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A nanomaterial composition of matter comprising
   (a) non-stoichiometric nanoparticles of tungsten oxide, and
   (b) at least one metal other than tungsten, wherein the composition comprises a tungsten bronze.

2. The nanomaterial composition of matter of claim 1, wherein the at least one metal other than tungsten is sodium.

3. The nanomaterial composition of matter of claim 1, wherein the at least one metal other than tungsten is selected from barium, zinc, calcium, tin, and combinations thereof.

4. The nanomaterial composition of matter of claim 1, further comprising oxygen.

5. The nanomaterial composition of matter of claim 1, wherein the nanomaterial composition comprises non-agglomerated nanoparticles.

6. The nanomaterial composition of matter of claim 1, wherein the nanomaterial composition comprises nanoparticles having non-functionalized surfaces.

7. The nanomaterial composition of matter of claim 1, wherein the nanomaterial composition comprises nanoparticles having functionalized or modified surfaces.

8. The nanomaterial composition of matter of claim 7, wherein the functionalized surfaces comprise fatty acids, propionic acid, stearic acid, oils and combinations thereof.

9. The nanomaterial composition of matter of claim 7, wherein the functionalized surfaces comprise organometallics comprising silicon or titanium.

10. The nanomaterial composition of matter of claim 1, wherein the nanomaterial composition comprises particles having a mean particle size of less than 100 nanometers.

11. A nanomaterial composition of matter comprising
    (a) non-stoichiometric nanoparticles of tungsten oxide, and
    (b) at least one metal other than tungsten, wherein the at least one metal other than tungsten is sodium.

* * * * *